United States Patent
Post et al.

(10) Patent No.: US 10,154,377 B2
(45) Date of Patent: Dec. 11, 2018

(54) VEHICLE TO VEHICLE COMMUNICATIONS DEVICE AND METHODS FOR RECREATIONAL VEHICLES

(71) Applicant: Polaris Industries Inc., Medina, MN (US)

(72) Inventors: Benjamin L. Post, Minneapolis, MN (US); Brian D. Krosschell, North Branch, MN (US); Benjamin J. Betcher, Shakopee, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/262,113

(22) Filed: Sep. 12, 2016

(65) Prior Publication Data

US 2018/0077524 A1 Mar. 15, 2018

(51) Int. Cl.
*H04W 4/23* (2018.01)
*G08G 1/00* (2006.01)
(Continued)

(52) U.S. Cl.
CPC .............. *H04W 4/023* (2013.01); *G08G 1/22* (2013.01); *H04L 67/12* (2013.01); *H04W 4/029* (2018.02); *H04W 4/06* (2013.01); *H04W 84/18* (2013.01)

(58) Field of Classification Search
CPC ........ H04L 67/18; G08G 1/161; G08G 5/045; G08G 1/0962; G08G 1/16; G08G 3/02;
(Continued)

(56) References Cited

U.S. PATENT DOCUMENTS 6,700,504 B1 * 3/2004 Aslandogan ........... G08G 1/087
340/901
7,263,379 B1 * 8/2007 Parkulo .................. G08B 21/02
340/501
(Continued)

FOREIGN PATENT DOCUMENTS

CN 101031161 A 9/2007
EP 2975592 A1 1/2016
WO WO 2014134148 A2 * 9/2014 ............. G01C 21/00

OTHER PUBLICATIONS

International Search Report dated Dec. 15, 2017, International Application No. PCT/US2017/051120, 4 pages.
(Continued)

*Primary Examiner* — Daniel Lai
(74) *Attorney, Agent, or Firm* — Faegre Baker Daniels LLP

(57) ABSTRACT

A mobile communication device and method of using, the device including a processor, a communications module for a MESH network; a GPS module to determine a global position; and at least one output. The processor receives at least one instance of location data authored by at least one system of one or more other vehicles. Each instance of location data received via the MESH network describing a location of said other vehicle that authored the data. The processor comparing received location data to position data obtained from the GPS module; determining, based on the comparing, a level that is descriptive of a likelihood of interaction between the mobile communication device and the one or more other vehicles; and generating a signal to the at least one of the audio output and display output that is responsive to the determined level.

35 Claims, 8 Drawing Sheets

(51) Int. Cl.
*H04W 4/02* (2018.01)
*H04L 29/08* (2006.01)
*H04W 4/029* (2018.01)
*H04W 4/06* (2009.01)
*H04W 84/18* (2009.01)

(58) Field of Classification Search
CPC ....... H04W 4/046; H04W 4/008; H04W 4/02; H04W 4/023; H04W 4/027; H04W 4/028; H04W 76/023; H04W 84/18; H04W 8/005; H04W 4/06
See application file for complete search history.

(56) References Cited

U.S. PATENT DOCUMENTS

| | | | |
|---|---|---|---|
| 7,546,182 B2 | 6/2009 | Mudalige | |
| 9,646,502 B1* | 5/2017 | Gentry | G08G 5/0039 |
| 2005/0222716 A1 | 10/2005 | Tengler | |
| 2006/0068822 A1 | 3/2006 | Kalhan | |
| 2007/0003162 A1* | 1/2007 | Miyoshi | G06T 15/20 |
| | | | 382/276 |
| 2007/0152804 A1* | 7/2007 | Breed | B60N 2/2863 |
| | | | 340/435 |
| 2008/0091352 A1* | 4/2008 | O'Hare | G08G 1/163 |
| | | | 701/301 |
| 2010/0069058 A1* | 3/2010 | Rothschild | H04W 76/02 |
| | | | 455/422.1 |
| 2010/0070180 A1* | 3/2010 | Ridenour | G08G 5/045 |
| | | | 701/301 |
| 2010/0080168 A1* | 4/2010 | Fukuyama | H04L 45/121 |
| | | | 370/328 |
| 2011/0142016 A1* | 6/2011 | Chatterjee | G06Q 30/02 |
| | | | 370/338 |
| 2012/0166533 A1* | 6/2012 | Rubinstein | G06Q 30/0224 |
| | | | 709/204 |
| 2014/0210644 A1* | 7/2014 | Breed | G01S 17/936 |
| | | | 340/905 |
| 2016/0057639 A1* | 2/2016 | Smith | H04W 4/028 |
| | | | 455/423 |

OTHER PUBLICATIONS

TIPO's Search Report for Taiwan Patent Application No. 106130736. 1 page, dated Apr. 28, 2018.

* cited by examiner

VEHICLE TO VEHICLE COMMUNICATIONS DEVICE AND METHODS FOR RECREATIONAL VEHICLES

FIELD OF THE DISCLOSURE

The present disclosure relates generally to communications devices and methods between recreational vehicles. The present disclosure relates more specifically to devices and methods for communicating location data between recreational vehicles.

BACKGROUND

Recreational vehicles, including Off Road Vehicles, ATVs, snowmobiles, watercraft, etc., often operate on non-road terrain. Such environments potentially lack the order and predictability of vehicle operation in on-road environments. Still further, such recreational vehicles are often operated in conjunction with other recreational vehicles. The off-road locations are further often removed from communication infrastructure or where such infrastructure is unreliable, such as areas where cellular communication is absent.

SUMMARY

The present disclosure includes a first embodiment having a mobile communication device including: a processor, a communications module, the processor having instructions thereon to utilize the communications module to participate in a MESH network having two or more participants; a GPS module operable to determine a global position of the GPS module; and at least one of an audio output and a display output. The processor has instructions that when carried out by the processor, cause the processor to: receive at least one instance of location data authored by at least one system of one or more other vehicles, each instance of location data received describing a location of said other vehicle that authored the data, the at least one instance of location data being received via the MESH network; compare received location data to position data obtained from the GPS module; determine, based on the comparing, a level that is descriptive of a likelihood of interaction between the mobile communication device and the one or more other vehicles; and generate a signal to the at least one of the audio output and display output that is responsive to the determined level.

The present disclosure also includes an embodiment including a method of operating a MESH communications network, including: providing a communications device having a processor, a communications module operable to communicate via a MESH network, a GPS module operable to determine a global position of the GPS module; at least one of an audio output and a display output; receiving at least one instance of location data authored by at least one system of one or more other vehicles, each instance of location data received describing a location of said other vehicle that authored the data, the at least one instance of location data being received via the MESH network; comparing received location data to position data obtained from the GPS module; determining, based on the comparing, a level that is descriptive of a likelihood of interaction between the mobile communication device and the one or more other vehicles; and generating a signal to the at least one of the audio output and display output that is responsive to the determined level.

In yet another embodiment, the present disclosure includes a non-transitive computer readable medium having instructions thereon, that when interpreted by a processor cause the processor to: provide a communications device having a processor, a communications module operable to communicate via a MESH network, a GPS module operable to determine a global position of the GPS module; at least one of an audio output and a display output; receive at least one instance of location data authored by at least one system of one or more other vehicles, each instance of location data received describing a location of said other vehicle that authored the data, the at least one instance of location data being received via the MESH network; compare received location data to position data obtained from the GPS module; determine, based on the comparing, a level that is descriptive of a likelihood of interaction between the mobile communication device and the one or more other vehicles; and generate a signal to the at least one of the audio output and display output that is responsive to the determined level.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
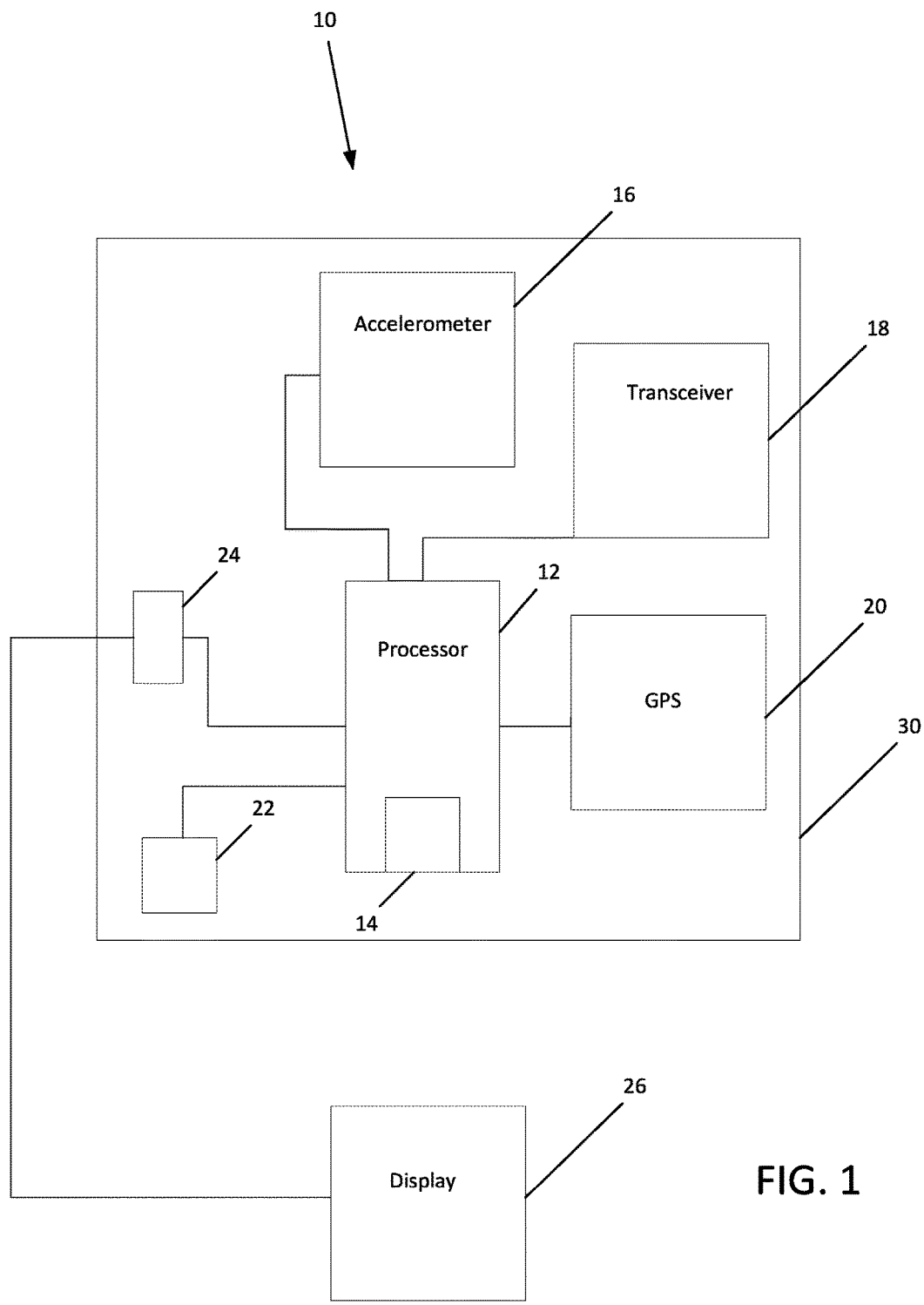
FIG. 1 is a diagrammatical view of an exemplary vehicle communication system of the present disclosure.

Referring initially to FIG. 1, an illustrative embodiment of a vehicle communications system 10 includes a processor 12, an accelerometer 16, an RF transceiver 18, a GPS module 20, an audio output 22, a display output 24, and display 26. Communications system 10 is shown to include a housing 30. The illustrated embodiment of communications system 10 is shown as a distinct unit that can be readily added to and removed from a vehicle. However, embodiments are envisioned where the communications system 10 is integrated into other computing elements of a vehicle such that system 10 is part of a multi-purpose computing entity on-board a vehicle.

Processor 12 is illustratively a microcontroller that provides the brains for the device and drives the operation of the other components. The microcontroller is suitable for handling a wide range of programming/processing tasks and is programmable via USB port 14, or over the air. In one embodiment, processor 12 includes a NXP Kinetic, ARM Cortex M4, 32-bit processor with a clock speed of 96 MHz, 256 k of Flash memory, and 64 kB of RAM.

The microcontroller software illustratively includes libraries for timing, Controller Area Network (CAN) communications, Global Positioning Systems, Inter-integrated Circuits (I2C), Magnetometer/Accelerometer control, sensor control, radio support (including MESH mode), Dynamic List Management, and controlling an LED array (such as LED's 32, discussed below).

Accelerometer 16 is illustratively a combined magnetometer/accelerometer module which provides static vehicle heading while at rest and can detect events such as rollovers or crashes.

RF transceiver 18 is illustratively a 900 Mhz transceiver radio capable of forming a MESH network when in range with other vehicles. Transceiver 18 sends and receives data to and from other communication systems 10 within range. Transceiver 18 is illustratively a Digi XBee Pro 900 HP having a 250 mW output that is MESH Capable with a Line of Sight range at 10 Kps of up to 9 miles and an urban range of up to 2000 ft.

GPS module 20 provides vehicle location and heading information while the vehicle is in motion. An exemplary GPS module 20 is a Mediatek, MTK3339 chipset with a 10 Hz update capacity.

Audio Output 22 is illustratively at least one of a speaker, beeper, or similar element that is able to produce an audibly perceivable signal. In one example, audio output 22 is an interface, such as a plug or pins that is able to attach to a speaker or audio element.

Embodiments are also envisioned that include one or more ports suitable for connecting an external antenna (not shown). The antenna(e) is operable to aid in operation of GPS module 20 and RF transceiver 18.

Display output 24 is illustratively a four-pin header suitable for engagement by a plug coupled to a display 26. It should be appreciated that the exact form of display output 24 is not critical so long as it provides an interface for supplying data to a display 26. As the sophistication of the display 26 used is increased, similar increase in the complexity and data transmission requirements of the display output 24 are also supplied. The exemplary display output 24 further provides power to run display 26.

Figure 2A:
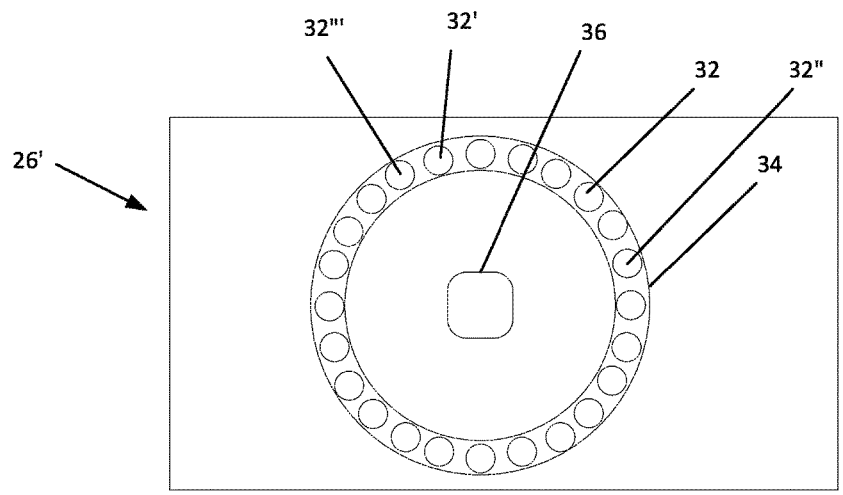
FIG. 2A is a first exemplary diagrammatical view of a display of the system of FIG. 1.

FIG. 2A shows a first embodiment display 26'. Display 26' is a ring 34 of LED's 32. The pictured example includes sixteen LED's 32 distributed on the ring 34. The LED's are illustratively multi-color LED's such that each LED 32 is capable of outputting light of differing colors. In the present example, each LED 32 is able to produce Green, Yellow, and Red light. Each LED 32 is able to be independently activated. In the center of the ring 34 is an icon that is a representation 36 of the vehicle to which the display 26 is attached. In one embodiment, the representation 36 is simply a square LED that lights to inform a user/rider that the display 26 is active.

Figure 2B:
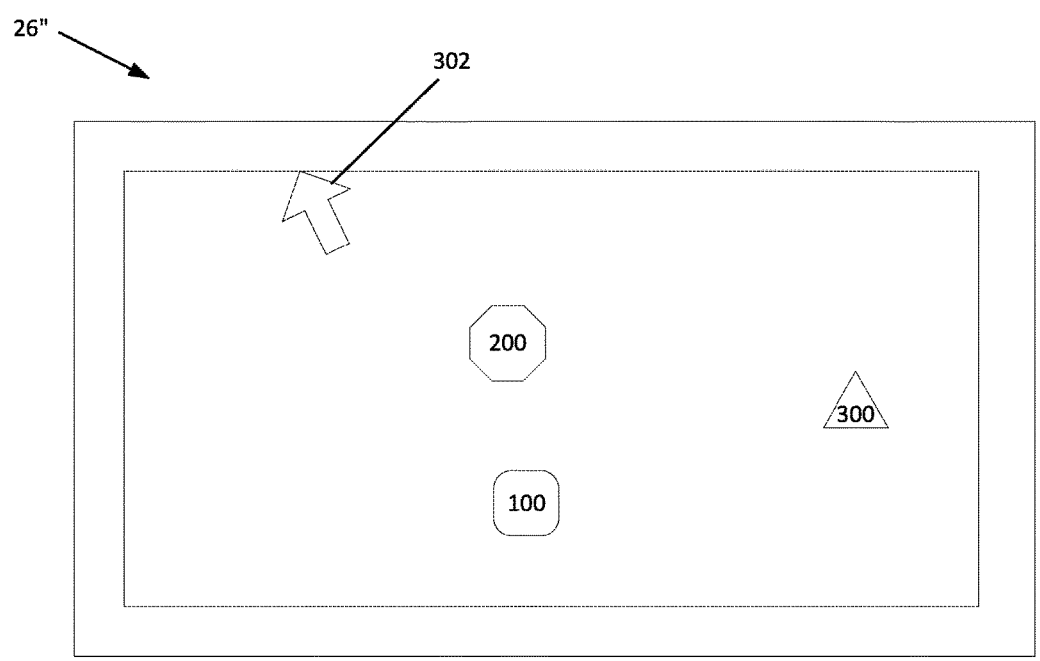
FIG. 2B is a second exemplary diagrammatical view of a display of the system of FIG. 1.

FIG. 2B shows a second embodiment display 26". Display 26" is illustratively a screen display 26". The screen is of the type used in small televisions, smartphones, tablet computers and the like.

In operation, processor 12 includes instructions to send commands and data to and receive data from the other components. Processor 12 runs in a continuous loop that gathers information from GPS module 20 regarding the current geographical position of the system 10 and thus the vehicle (illustrated as 100) to which it is attached. The loop running on processor 12 further gathers information from accelerometer 16. The data from accelerometer 16 provides information about the speed and movement of the vehicle. Data received from GPS module 20 and accelerometer 16 is used to generate a "cone of influence." The cone of influence is an area that the vehicle will potentially occupy in the near term. "Near term" is illustratively defined as a threshold time, such as 5, 10, 20, 30, or 40 seconds.

Figure 3:
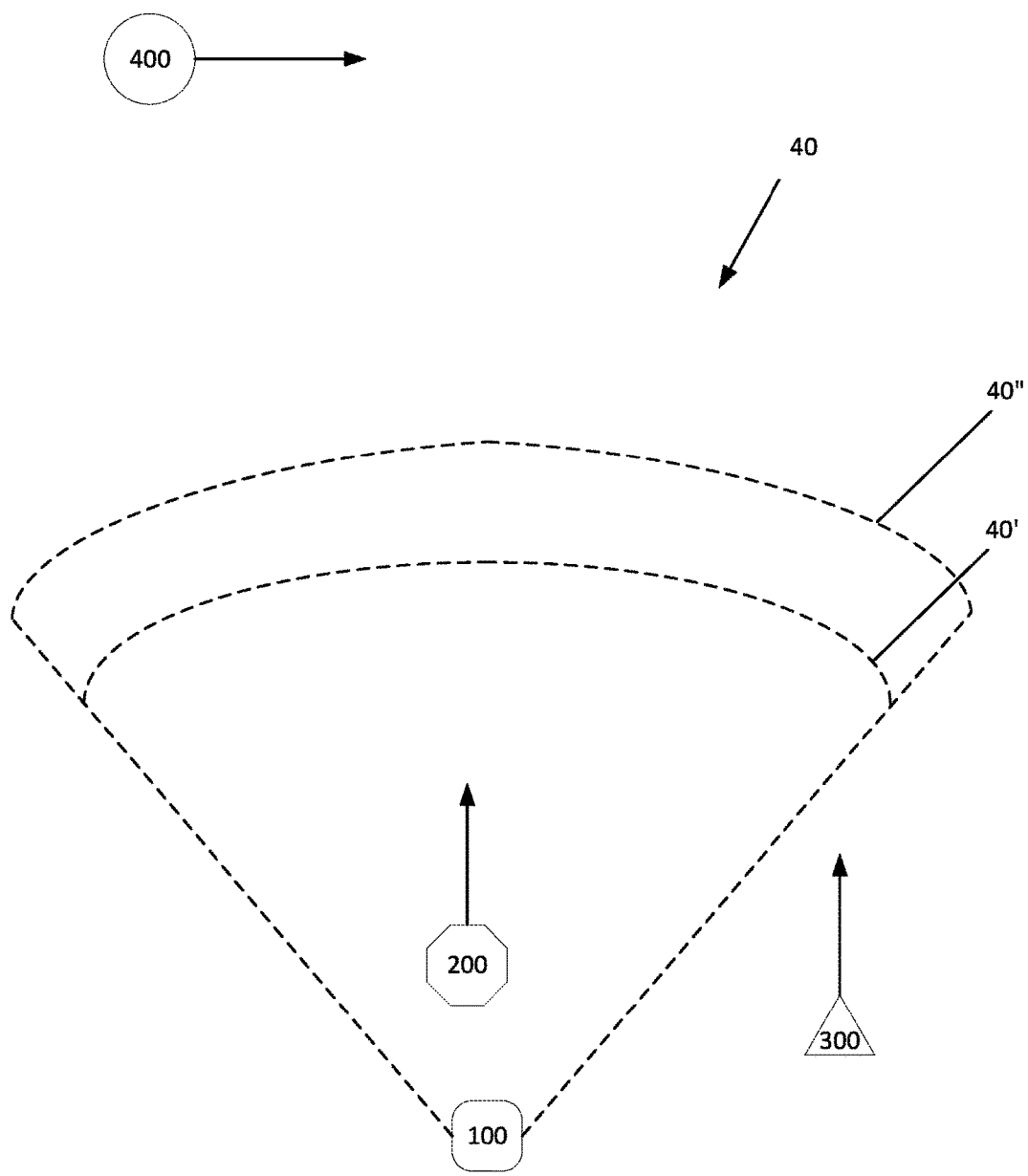
FIG. 3 is a representative view of exemplary a cone of influence as calculated by the system of FIG. 1.

FIG. 3 shows an exemplary cone of influence 40. This size and shape of the cone adjusts based on the speed and heading derived from the GPS module 20 and accelerometer 16. As such, the slower the vehicle is moving the smaller the size of the cone 40, such as cone 40'. Conversely, the faster the vehicle is moving, the larger the cone 40" since the range of where the vehicle could be in the near future is larger. In still further examples, the size and heading of the cone of influence can be impacted by elements, such as weather, time of day, visibility, topographical considerations, and any other available input consideration that has the potential to impact a rider's operation of the vehicle. Also, in certain embodiments, signals regarding breaking, turning, and other vehicle operation are available to can be considered as part of the process defining the cone of influence. Furthermore, while the term "cone" is used and a cone-like shape is shown for the cone of influence 40 of FIG. 3, embodiments are envisioned where other shapes of influence are used.

Processor 12 further instructs operation of RF transceiver 18. Transceiver 18 is capable of forming a MESH network when in range with other systems 10 (other vehicles 200, 300, 400) and is used to send data to and receive data from other systems (vehicles 200, 300, 400, riders) within range.

A MESH network is a network topology in which each node relays data for the network. MESH nodes (system 10) cooperate in the distribution of data in the network. MESH networks do not require a central location with which all nodes must be in range of. MESH networks are a type of an ad-hoc network where nodes can enter and leave in real time. More specifically, system 10 provides a node in a mobile ad hoc network (MANET). A MANET is a continuously self-configuring, infrastructure-less network of mobile devices connected wirelessly. Each device (such as system 10) in a MANET is free to move independently in any direction, and will therefore change its links to other devices as able/required. Each device (system 10) forwards traffic unrelated to its own use, and therefore also acts as a router. MANETs provide a peer-to-peer, self-forming, self-healing network. It should be appreciated that the present system 10 is operable to provide a MESH network covering long distance (meaning greater than 150 meters in certain embodiments, and greater than 500 meters in other embodiments). Accordingly, any participating node/vehicle/system 10 can transmit data (such as location and trajectory data) about itself (acting as an author of the data) and can transmit data received about another node (acting as a conveyor of the data). As such, two systems 10 that are out of range of each other can still receive data about each other if other nodes are in-between to repeat and convey the information on.

Part of operating a MESH network is that nodes (system 10) maintain an at least partial list of the other nodes currently in the network. As previously noted, processor 12 obtains GPS and acceleration information from GPS module 20 and accelerometer 16, respectively. Some or all of this information is provided to RF transceiver 18 and distributed to the MESH network (and the MESH network nodes, which are other communications systems 10). Thus, for a given communications system 10, RF transceiver 18 is receiving information regarding other communications systems 10 (regarding other vehicles 200, 300, 400). In one embodiment, communications system 10 receives GPS information for other networked vehicles 200, 300, 400. In another embodiment, communications system 10 also receives acceleration information or other information (such as historical GPS information) to provide an indication of heading and speed.

Having received the GPS information (and possibly heading and speed information) communications system 10 considers this information as it relates to the cone of influence. When a message is received by a system 10 via RF transceiver 18, the system checks (compares) the known and expected positions reported by the other systems 10 (vehicle location for vehicles 200, 300, 400) relative to the cone of influence for the present system 10 (vehicle 100). FIG. 3 shows cone 40 for vehicle 100 with communications system 10 as well as three other vehicles (100, 200, 300) with similar communications systems. The data from vehicle 200 indicates a position slightly forward of vehicle 100 (and on-board system 10) in the direction of travel of vehicle 100. The arrow depicted attached to each vehicle 200, 300, 400 indicates the direction of travel of the vehicle 200, 300, 400. Vehicle 200 is within the cone of influence 40 and identified as having a relatively high likelihood of interaction with the vehicle 100 containing system 10. The data from vehicle 300 indicates a position to the side and slightly forward of vehicle 100 (and system 10) in the direction of travel of the vehicle 100. Vehicle 300 is outside the cone of influence 40 but close and with the possibility of entering the cone of influence 40 in a short period of time. Vehicle 300 is thus identified as having a moderate likelihood of interaction with the vehicle 100 containing system 10. The data from vehicle 400 indicates a position well forward of vehicle 100 in the direction of travel of the vehicle 100 containing system 10. Vehicle 400 is outside of the cone of influence 40 and identified as having a relatively low likelihood of interaction with the vehicle 100 containing system 10.

Having detected, located, and categorized three vehicles, system 10 then communicates with display 26 to communicate this data to a user/rider of the vehicle containing system 10. In the embodiment using display 26″, the screen is able to present a representation of the vehicles (or a subset of the vehicles) thereon. Vehicles 200, 300 are illustratively shown positioned relative to the vehicle 100 containing system 10. Vehicle 200 is displayed as an octagon, potentially a red octagon, to suggest to a viewer the relatively higher potential for interaction therewith (as determined with reference to the cone of influence). Vehicle 300 is displayed as a triangle, potentially a yellow triangle, to suggest to a viewer the relatively moderate potential for interaction therewith (as determined with reference to the cone of influence). Vehicle 400 is not displayed to reflect the relatively lower potential for interaction therewith (as determined with reference to the cone of influence). Alternatively, an arrow 302 is displayed that indicates a general area/direction in which vehicle 400 is located. However, as can be appreciated, in situations where a large number of vehicles are present, having an arrow for each detected low-potential vehicle can clutter the screen. Still further, in certain embodiments, unique symbols can be assigned to specific vehicles to allow for ready identification of those specific vehicles/operators.

In the embodiment using display 26′, the ring of LEDs is able to present a representation of the vehicles (or a subset of the vehicles) thereon. Vehicles 100, 200, 300 are represented by LEDs 32 in the positional direction that they are located relative to the vehicle 100 having the system 10. Vehicle 200 is displayed as a red lit LED 32′, to suggest to a viewer the relatively higher potential for interaction therewith (as determined with reference to the cone of influence) and to show the relative position of the vehicle. Vehicle 300 is displayed as a yellow lit LED 32″, to suggest to a viewer the relatively moderate potential for interaction therewith (as determined with reference to the cone of influence) and to show the relative position of the vehicle. Vehicle 400 is displayed as a green lit LED 32′″ to reflect the relatively lower potential for interaction therewith (as determined with reference to the cone of influence). Alternatively, no representation of vehicle 400 is provided. In the event that multiple vehicles are located in the same general direction such that they would both be most accurately depicted on the same LED 32, the vehicle having the greater likelihood of interaction dictates the color of LED 32.

It should be appreciated that while the provided examples have vehicles 200, 300, 400 all generally forward of the vehicle containing system 10 (in the direction of travel), vehicles behind the vehicle 100 containing system 10 would also be displayed. As such, the rider need not turn his head to detect such vehicles. Furthermore, the driver of the vehicle 100 containing system 10 may know to not slam on brakes in that doing so may cause another vehicle to impact his vehicle.

Still further, it should be appreciated that if vehicle 300 were to be operated such that it entered cone of influence 40, it would transition from being represented by a yellow LED 32 to a red LED 32 (in the case of display 26′). In one embodiment, the arrival of a new vehicle within the cone of influence, or a new vehicle being identified as one having a relatively higher potential for interaction, an audible signal is provided. In one example, processor 12 provides a signal to audio output 22 such that an audio signal is communicated to the operator of the vehicle having system 10.

Also, the above discussion focused on whether a vehicle 200, 300, 400 is within the cone of influence of the vehicle having system 10. In addition to the position data, trajectory data is also provided regarding vehicles 100, 200, 300. Thus, in one embodiment, the categorization as being higher, moderate, or lower risk of interaction is based on whether a current location or an expected near term location (based on vehicle trajectories) is within the cone of influence. As such, situations such as a vehicle approaching from behind or the side at a high rate of speed can be categorized as having a relatively high potential even though such vehicle is not presently within the cone of influence. Still further, while vehicle 100 is described as being the vehicle with system 10, in the provided disclosure, each of vehicles 200, 300, 400 would have a system 10 or a similar system able to communicate with system 10. Still further, a vehicle trajectory is typically one that assumes continued motion of a vehicle in a current heading, or continued progress down a known path (if the system is also able to consider maps). Thus, in some cases, an expected future location may be highly speculative and in others, the future path may be associated with a high degree of confidence. Accordingly, in some embodiments, levels of confidence can be associated with different potential future locations of a given vehicle. Thus, in some embodiments, categorizing a vehicle's risk of interaction is dependent upon the likelihood of a future location within the cone of influence rising above a set threshold.

Figure 4:
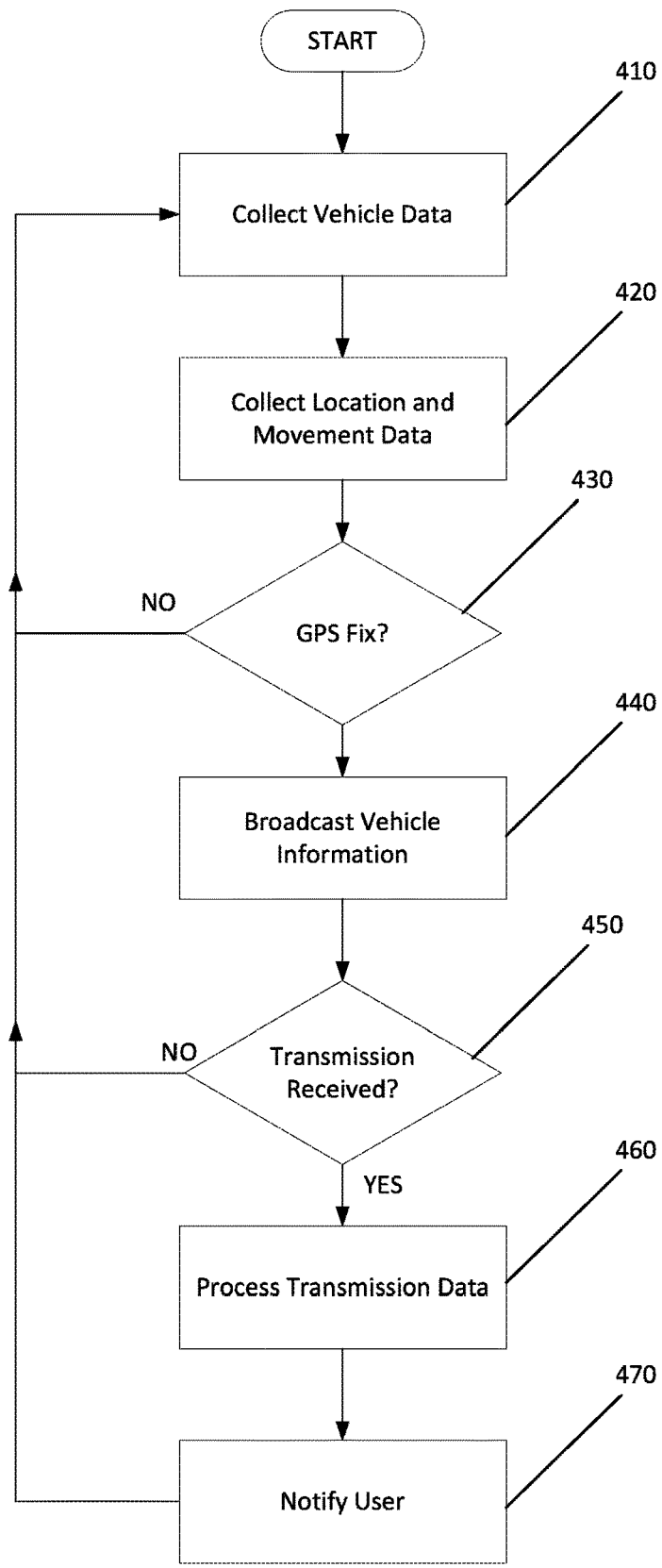
FIG. 4 is a flowchart showing operation of the system of FIG. 1.

FIG. 4 shows a method of operation for communications system 10. First, system 10 collects data from its own vehicle 100 regarding vehicle identity, block 410. Such information comes via CAN bus if available. Regardless of the route, the system 10 collects a unique identifier that will allow vehicle 100 and the instance of system 10 attached to vehicle 100 to be uniquely identified. System 10 then checks to see if there is a GPS Fix such that GPS module 20 is able to provide location information about vehicle 100, block 420. If no GPS fix is present then system 10 returns to block 410. If a GPS fix is present, location and movement data is collected, block 430. Additional detail on block 430 is provided via FIG. 5. Then system 10 uses RF transceiver 18 to broadcast information (including GPS location data and heading data), block 440. System 10 then checks to see if any transmissions are received from other systems 10 associated with other vehicles 200, 300, 400, block 450. If no transmission is received from another vehicle 200, 300, 400 then system 10 returns to block 410. If a transmission is received then that transmission (and any others received) is processed, block 460. Increased specificity on the handling of received transmissions is discussed below with reference to FIG. 6. Once transmissions are processed, the user of vehicle 100 is alerted, if appropriate, block 470. Increased specificity on the process to of notifying a user/rider is discussed below with reference to FIG. 7. Once a user is notified (if appropriate), the system 10 returns to block 410.

Figure 5:
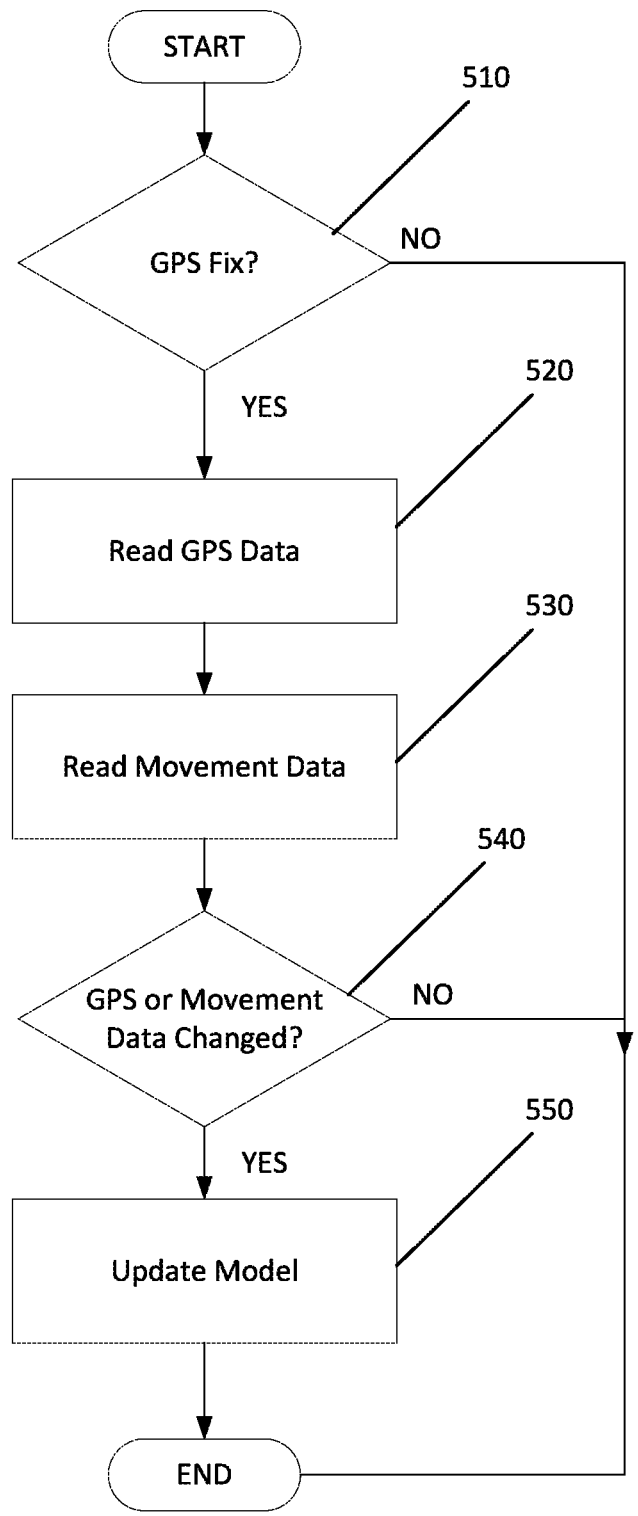
FIG. 5 is a flowchart showing operation of interaction with the GPS module of FIG. 1.

FIG. 5 shows a sub-routine and provides additional detail on block 430 of FIG. 4. GPS data is obtained/read from GPS module 20, block 510. Movement data is also obtained from one or more of GPS module 20, accelerometer 16, or another device providing movement information, block 520. If the GPS data and movement data hasn't changed since last being read, then the sub-routine ends, block 530. If at least one of the GPS data and movement data has changed since last being read, block 530, then the model of vehicle movement is updated with the changed information, block 540. Then, the sub-routine ends.

Figure 6:
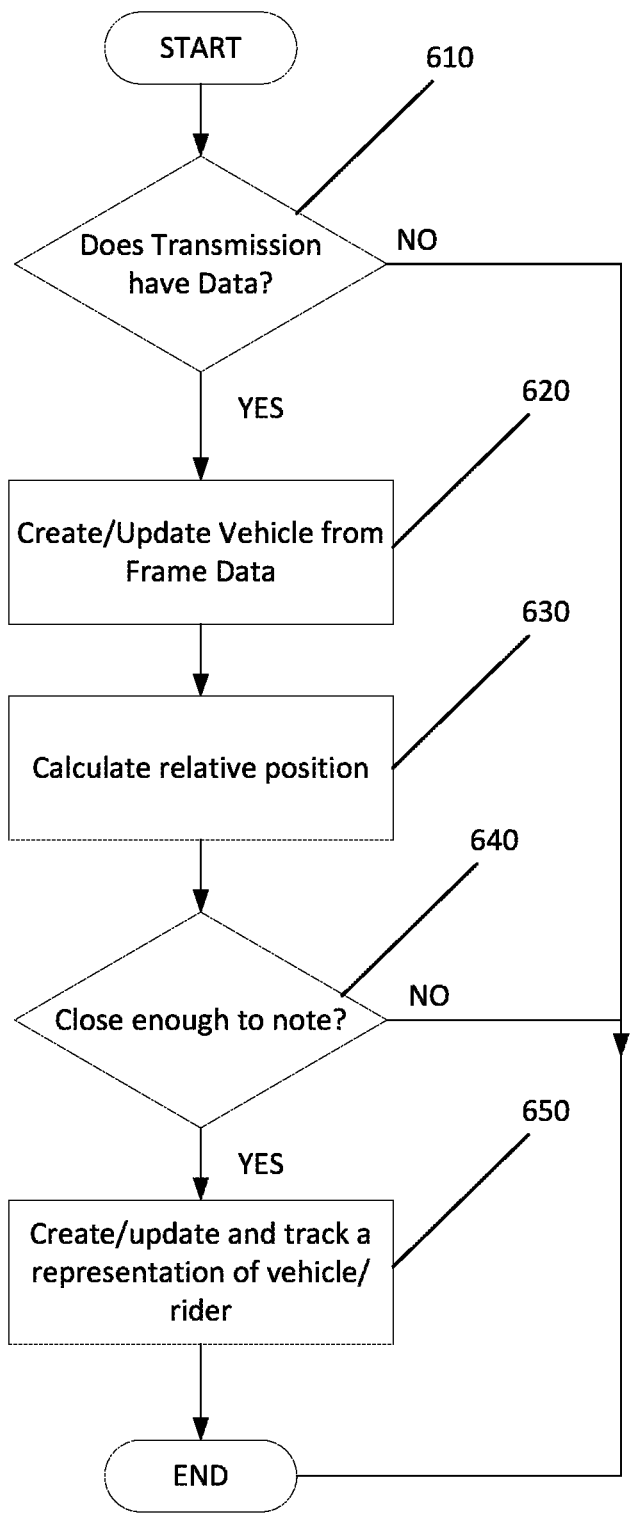
FIG. 6 is a flowchart showing reception and processing of a received transmission by the system of FIG. 1.

FIG. 6 shows a sub-routine and provides additional detail on block 460 of FIG. 4. Again, block 460 is called when a transmission is received from another system 10 of another vehicle 200, 300, 400. Block 610 checks the transmission to see if it contains data. If no data is present, the sub-routine ends. If the transmission does have data, then an entry for the vehicle that sent the data is created (if this is the first time that the data has been received from the vehicle) or updated (if the vehicle is a "known" vehicle), block 620. The identification of a vehicle is achieved via a unique ID field in the transmitted date. Using the received data and the known position of vehicle 100 from GPS module 20, the relative position of the vehicle 200 to vehicle 100 is determined, block 630. Based on the calculation of relative position, system 10 determines if vehicle 200 is positioned so as to warrant mention to the operator of vehicle 100, block 640. The determination of whether to mention a vehicle considers the cone of influence discussed above with respect to FIG. 3. Accordingly, as discussed above, the consideration includes not only the physical location of vehicles 100, 200 but the respective positions they are expected to occupy in the near term. If the particular vehicle does not warrant mention/note to the user of vehicle 100, the sub-routine ends. Alternatively, the sub-routine of FIG. 6 is repeated for any additional transmission received from another vehicle, such as vehicle 300, 400. If the vehicle 200 warrants mention then a representation of the vehicle is created and/or updated, block 650. The sub-routine then ends, or alternatively proceeds to process a transmission from another vehicle.

Figure 7:
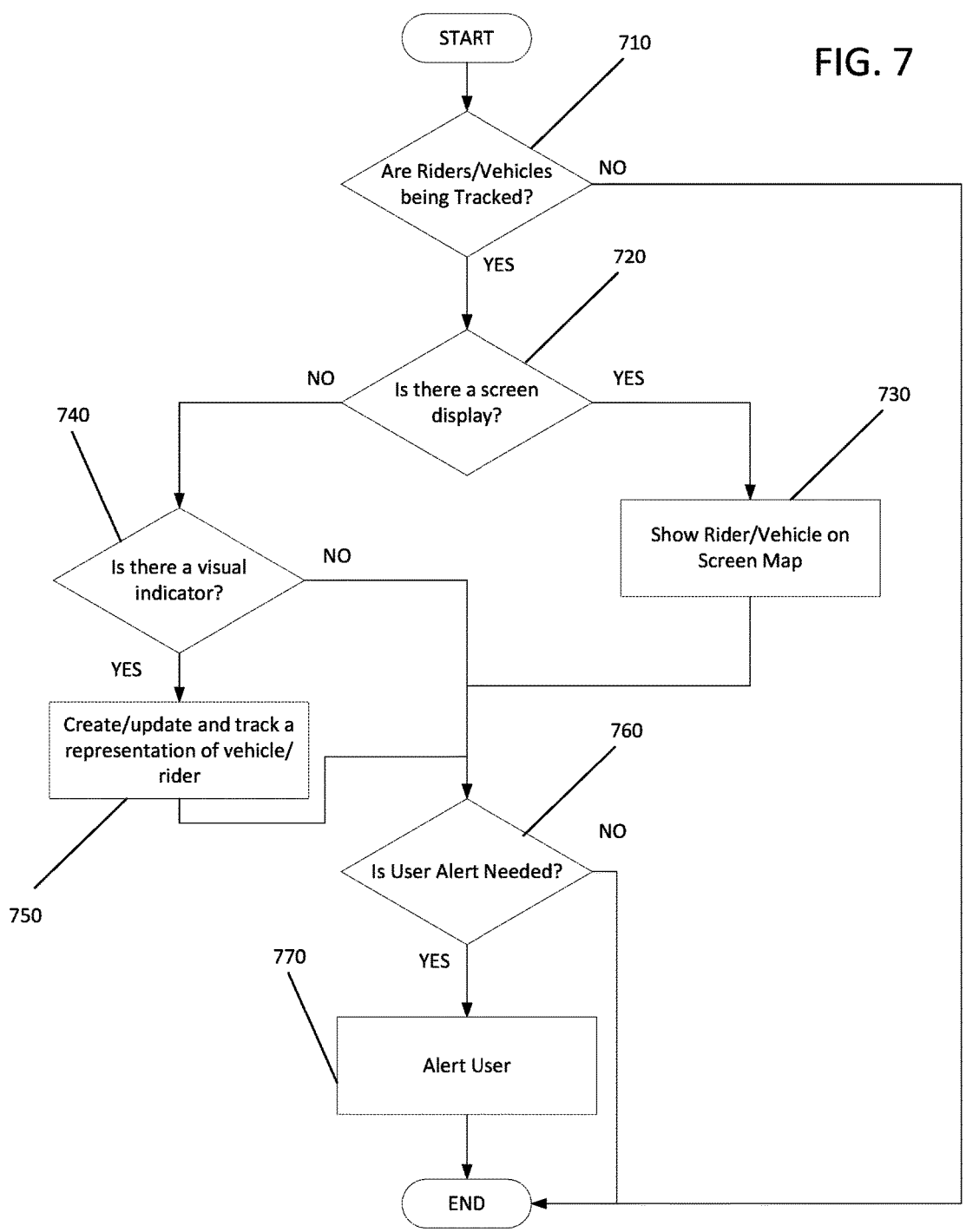
FIG. 7 is a flowchart showing a process of driver communication for the system of FIG. 1.
Figure 8:
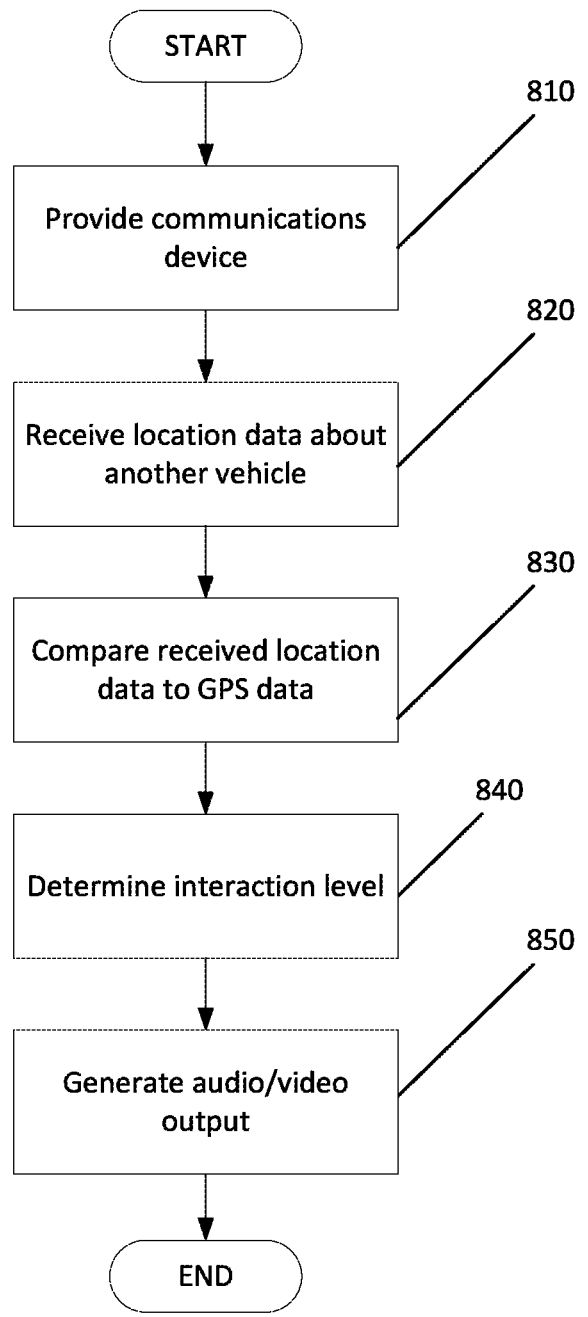
FIG. 8 is another embodiment of operation of the system of FIG. 1.

FIG. 7 shows a sub-routine and provides additional detail on block 470 of FIG. 4. First, it is determined if any vehicles 200, 300, 400 are being tracked, block 710. If not, then the sub-routine ends. If vehicles are being tracked, then it is determined whether vehicle 100 has a screen display 26", block 720. If there is a screen display, then the vehicle 200 is shown on a map on the screen display 26". Afterward, the sub-routine proceeds to block 760. If there is no screen display, then it is determined if there is another type of visual indicator on vehicle 100 (such as LED ring display 26'), block 740. If there is no visual indicator present, then the sub-routine proceeds to block 760. If there is a visual indicator present on vehicle 100, then a representation of the vehicle 200 is created and/or updated. Then the sub-routine proceeds to block 760. Block 760 determines of the detected position and motion of vehicle 200 (or 300, 400, etc) causes the need for a user alert, block 760. If no alert is needed, the sub-routine ends. If an alert is needed, then the alert is created and issued, block 770.

Alerts to a user can take any suitable form (visual, audio, etc). In certain cases additional steps can be taken such as limiting vehicle operation (limiting throttle, braking).

In certain embodiments, in addition to considering location, speed, and acceleration type data for determining a likely future position, system 10 also considers topographical elements, such as terrain, trails, roads, etc. In one embodiment, system 10 considers likely path of travel for each detected vehicle 100, 200, 300, 400 and determines if the likely paths ever intersect and further whether multiple vehicles are ever likely to attempt to inhabit the same real estate. If such a condition is determined to exist, system 10 further considers the period of time (how long) from a current time in which such intersection would occur. As the time to such an intersection decreases, the likelihood of issuing an alert to one or more riders increases.

In certain embodiments, system 10 includes functionality to transmit and to also receive data regarding rollovers or crashes. When a rollover or crash of vehicle 100 is detected, RF transceiver 18 sends out an alert to this effect. Whenever a rollover/crash alert is received by RF transceiver 18 of vehicle 200 (or 100) a distinct alert is illustratively generated to communicate the event to the other user(s) and alert them to potentially render aid. Still further, the location of the potentially disabled vehicle is also communicated such that a user desiring to provide aid can readily find the distressed vehicle.

In certain embodiments, rather than providing a fully functional system 10 to each vehicle 100, 200, 300, 400, certain vehicles are provided with a device that only transmits location information. As such, a parent could be riding a vehicle and be able to track his/her children without providing the children's vehicles with a full tracking system 10.

In one embodiment, screen 26" is provided via a user's phone that is connected via Bluetooth or otherwise to system 10. It should be appreciated that the present system is able to provide long range MESH network communication. In the present application, "long range" is intended to mean greater than 150 m other embodiments intend long range to mean greater than 300 m.

In one embodiment, when all received transmissions at vehicle 100 indicate that other vehicles 200, 300, 400 are far away from and without the potential to enter a cone of influence in a near term, a frequency with which position information is transmitted by vehicle 100 is reduced. As such, the system presents a variable transmission rate that is responsive to prioritize network bandwidth for systems 10/vehicles having greater likelihood of near-term interaction with other vehicles.

According to one embodiment, operation of system 10 includes the following. A vehicle is provided with the communications system/device 10, block 810. The device having a processor 12, a communications module operable to communicate via a MESH network, a GPS module operable to determine a global position of the GPS module; and at least one of an audio output and a display output. System 10 listens for and receives a signal from another compatible system (such as a system 10) coupled to another vehicle, block 820. The received data includes a location of said other vehicle that authored the data. The location data is received via the MESH network. The processor 12 then compares received location data to position data obtained from the GPS module 20, block 830. The processor 12 then determines an interaction level that is descriptive of a likelihood of interaction between the mobile communication device and the one or more other vehicles, block 840. The determination is based on the comparing of the GPS data from GPS module 20 and the received data. In one embodiment, this includes consideration of a cone of influence. Responsive to the determination, an output is generated that is descriptive of the determined interaction level, block 850

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A mobile communication device supported by a vehicle, the mobile communication device including:
   a processor;
   a communications module, the processor having instructions thereon to utilize the communications module to participate in a MESH network;
   a GPS module operable to determine a global position of the GPS module; and
   at least one of an audio output and a display output, the processor having instructions that when carried out by the processor cause the processor to:
      receive at least one instance of location data authored by a system of at least another vehicle, the received at least one instance of location data describing a location of the at least another vehicle that authored the data, the at least one instance of location data being received via the MESH network;
      generate an area of influence based in part on position data obtained from the GPS module, the area of influence defining a group of expected near-term locations of the mobile communication device supported by the vehicle;
      compare the received at least one instance of location data to position data obtained from the GPS module, including comparing the received at least one instance of location data to the area of influence;
      determine, based on the comparing, a level that is descriptive of a likelihood of interaction between the mobile communication device supported by the vehicle and the at least another vehicle, wherein determining the level of the likelihood of interaction based on the comparing comprises determining the level of the likelihood of interaction based on the comparing of the received at least one instance of location data to the area of influence; and
      generate a signal to the at least one of the audio output and display output that is responsive to the determined level.

2. The device of claim 1, wherein:
   the received at least one instance of location data also includes trajectory data associated with the at least another vehicle;
   the instructions further cause the processor to use the received trajectory data to determine an expected near-term location of the at least another vehicle; and
   determining the level of the likelihood of interaction further comprises considering the expected near-term location of the at least another vehicle.

3. The device of claim 1, wherein the area of influence defining a group of expected near-term locations of the mobile communication device supported by the vehicle comprises the area of influence defining a group of locations in which the mobile communication device supported by the vehicle has greater than a threshold likelihood of being located within a defined period of time.

4. The device of claim 3, wherein the area of influence is a cone of influence.

5. The device of claim 1, wherein the mobile communication device is mounted on the vehicle.

6. The device of claim 1, wherein the communications module is operable to broadcast the received at least one instance of location data.

7. The device of claim 1, wherein generating the signal to the at least one of the audio output and display output includes generating a signal indicating a direction that the at least another vehicle is located relative to the mobile communication device supported by the vehicle and indicating the level of the likelihood of interaction between the mobile communication device supported by the vehicle and the at least another vehicle.

8. The device of claim 1, wherein the instructions further cause the processor to transmit position data obtained from the GPS module and trajectory information via the communications module.

9. The device of claim 1, wherein:
   the level of the likelihood of interaction is high when the received at least one instance of location data from the at least another vehicle indicates that the at least another vehicle is within the area of influence;
   the level of the likelihood of interaction is moderate when the received at least one instance of location data from the at least another vehicle indicates that the at least another vehicle (i) is outside the area of influence and (ii) has a high possibility of entering the area of influence in a short period of time; and
   the level of the likelihood of interaction is low when the received at least one instance of location data from the at least another vehicle indicates that the at least another vehicle (i) is outside the area of influence and (ii) does not have a high possibility of entering the area of influence in the short period of time.

10. The device of claim 9, wherein generating the signal to the at least one of the audio output and display output includes generating a signal indicating the level of the likelihood of interaction between the mobile communication device supported by the vehicle and the at least another vehicle as being high, moderate, or low.

11. The device of claim 10, wherein:
generating the signal to the at least one of the audio output and display output comprises generating the signal to the display output; and
the signal indicating the level of the likelihood of interaction visually indicates said level as being high, moderate, or low using different respective display colors.

12. The device of claim 11, wherein high is indicated with red, moderate is indicated with yellow, and low is indicated with green.

13. The device of claim 10, wherein generating the signal to the at least one of the audio output and display output further includes generating a signal indicating a direction that the at least another vehicle is located relative to the mobile communication device supported by the vehicle.

14. The device of claim 1, wherein the instructions further cause the processor to determine that the received at least one instance of location indicate that each of the at least another vehicle is far away from and without the potential to enter the area of influence in a near term, and responsively reduce a frequency with which one or both of position data obtained from the GPS module and the received at least one instance of location data is broadcast via the communication module.

15. A method of operating a MESH communications network, the method including:
providing a mobile communications device supported by a vehicle, the mobile communications device having a processor, a communications module operable to communicate via a MESH network, a GPS module operable to determine a global position of the GPS module, and at least one of an audio output and a display output;
receiving at least one instance of location data authored by a system of at least another vehicle, the received at least one instance of location data describing a location of the at least another vehicle that authored the data, the at least one instance of location data being received via the MESH network;
generating an area of influence based in part on position data obtained from the GPS module, the area of influence defining a group of expected near-term locations of the mobile communication device supported by the vehicle;
comparing the received at least one instance of location data to position data obtained from the GPS module, including comparing the received at least one instance of location data to the area of influence;
determining, based on the comparing, a level that is descriptive of a likelihood of interaction between the mobile communication device supported by the vehicle and the at least another vehicle, wherein determining the level of the likelihood of interaction based on the comparing comprises determining the level of the likelihood of interaction based on the comparing of the received at least one instance of location data to the area of influence; and
generating a signal to the at least one of the audio output and display output that is responsive to the determined level.

16. The method of claim 15, further including transmitting position data obtained from the GPS module and trajectory information via the communications module.

17. The method of claim 15, wherein:
the received at least one instance of location data also includes trajectory data associated with the at least another vehicle;
the method further comprises using the received trajectory data to determine an expected near-term location of the at least another vehicle; and
determining the level of the likelihood of interaction further comprises considering the expected near-term location of the at least another vehicle.

18. The method of claim 15, wherein the area of influence defining a group of expected near-term locations of the mobile communication device supported by the vehicle comprises the area of influence defining a group of locations in which the mobile communication device supported by the vehicle has greater than a threshold likelihood of being located within a defined period of time.

19. The method of claim 15, further including broadcasting, by the communications module, the received at least one instance of location data and position data obtained from the GPS module.

20. The method of claim 15, further including outputting a display signal that when received by a display is suitable for presenting a visual indication of a relative position of the mobile communication device supported by the vehicle and the at least another vehicle.

21. The method of claim 15, wherein:
the level of the likelihood of interaction is high when the received at least one instance of location data from the at least another vehicle indicates that the at least another vehicle is within the area of influence;
the level of the likelihood of interaction is moderate when the received at least one instance of location data from the at least another vehicle indicates that the at least another vehicle (i) is outside the area of influence and (ii) has a high possibility of entering the area of influence in a short period of time; and
the level of the likelihood of interaction is low when the received at least one instance of location data from the at least another vehicle indicates that the at least another vehicle (i) is outside the area of influence and (ii) does not have a high possibility of entering the area of influence in the short period of time.

22. The method of claim 21, wherein generating the signal to the at least one of the audio output and display output includes generating a signal indicating the level of the likelihood of interaction between the mobile communication device supported by the vehicle and the at least another vehicle as being high, moderate, or low.

23. The method of claim 22, wherein:
generating the signal to the at least one of the audio output and display output comprises generating the signal to the display output; and
the signal indicating the level of the likelihood of interaction visually indicates said level as being high, moderate, or low using different respective display colors.

24. The method of claim 23, wherein high is indicated with red, moderate is indicated with yellow, and low is indicated with green.

25. The method of claim 22, wherein generating the signal to the at least one of the audio output and display output further includes generating a signal indicating a direction that the at least another vehicle is located relative to the mobile communication device supported by the vehicle.

26. The method of claim 15, further comprising determining that the received at least one instance of location indicate that each of the at least another vehicle is far away from and without the potential to enter the area of influence in a near term, and responsively reducing a frequency with which one or both of position data obtained from the GPS module and the received at least one instance of location data is broadcast via the communication module.

27. A non-transitive computer readable medium having instructions to be interpreted by a processor of a mobile communication device supported by a vehicle, the instructions when interpreted by the processor causing the processor to:

receive at least one instance of location data authored by a system of at least another vehicle, the received at least one instance of location data describing a location of the at least another vehicle that authored the data, the at least one instance of location data being received via a MESH network;

generate an area of influence based in part on position data obtained from a GPS module of the mobile communication device supported by the vehicle, the area of influence defining a group of expected near-term locations of the mobile communication device supported by the vehicle;

compare the received at least one instance of location data to position data obtained from the GPS module, including comparing the received at least one instance of location data to the area of influence;

determine, based on the comparing, a level that is descriptive of a likelihood of interaction between the mobile communication device supported by the vehicle and the at least another vehicle, wherein determining the level of the likelihood of interaction based on the comparing comprises determining the level of the likelihood of interaction based on the comparing of the received at least one instance of location data to the area of influence; and generate a signal to at least one of an audio output and a display output of the mobile communication device supported by the vehicle that is responsive to the determined level.

28. The computer readable medium of claim 27, wherein the instructions further cause the processor to transmit position data obtained from the GPS module and trajectory information via a communications module of the mobile communication device supported by the vehicle.

29. The computer readable medium of claim 27, wherein the instructions further cause the processor to output a display signal that when received by a display is suitable for presenting a visual indication of a relative position of the mobile communication device supported by the vehicle and the at least another vehicle.

30. The computer readable medium of claim 27, wherein:
the level of the likelihood of interaction is high when the received at least one instance of location data from the at least another vehicle indicates that the at least another vehicle is within the area of influence;
the level of the likelihood of interaction is moderate when the received at least one instance of location data from the at least another vehicle indicates that the at least another vehicle (i) is outside the area of influence and (ii) has a high possibility of entering the area of influence in a short period of time; and
the level of the likelihood of interaction is low when the received at least one instance of location data from the at least another vehicle indicates that the at least another vehicle (i) is outside the area of influence and (ii) does not have a high possibility of entering the area of influence in the short period of time.

31. The computer readable medium of claim 30, wherein generating the signal to the at least one of the audio output and display output includes generating a signal indicating the level of the likelihood of interaction between the mobile communication device supported by the vehicle and the at least another vehicle as being high, moderate, or low.

32. The computer readable medium of claim 31, wherein:
generating the signal to the at least one of the audio output and display output comprises generating the signal to the display output; and
the signal indicating the level of the likelihood of interaction visually indicates said level as being high, moderate, or low using different respective display colors.

33. The computer readable medium of claim 32, wherein high is indicated with red, moderate is indicated with yellow, and low is indicated with green.

34. The computer readable medium of claim 31, wherein generating the signal to the at least one of the audio output and display output further includes generating a signal indicating a direction that the at least another vehicle is located relative to the mobile communication device supported by the vehicle.

35. The computer readable medium of claim 27, wherein the instructions further cause the processor to determine that the received at least one instance of location indicate that each of the at least another vehicle is far away from and without the potential to enter the area of influence in a near term, and responsively reduce a frequency with which one or both of position data obtained from the GPS module and the received at least one instance of location data is broadcast via the communication module.

* * * * *